Jan. 6, 1953 M. CAMRAS 2,624,574

CONSTANT SPEED DRIVE FOR MAGNETIC RECORD MEMBERS

Filed Aug. 13, 1948

Inventor
Marvin Camras by The Firm of Charles W. Hills Attys

Patented Jan. 6, 1953 2,624,574

UNITED STATES PATENT OFFICE 2,624,574

CONSTANT SPEED DRIVE FOR MAGNETIC RECORD MEMBERS

Marvin Camras, Chicago, Ill., assignor to Armour Research Foundation of Illinois Institute of Technology, Chicago, Ill., a corporation of Illinois Application August 13, 1948, Serial No. 44,058

11 Claims. (Cl. 271—2.3)

This invention relates to magnetic recording apparatus, and more particularly, to a method and means for driving a magnetic record member at constant speed over the electromagnetic transducer head of such apparatus.

If high fidelity is to be obtained in magnetic recording apparatus, it is essential that the speed at which the magnetic record member passes over the electromagnetic transducer head be the same during reproduction as during recording. Any variation in the speed that might occur during the recording period will mar exactness of reproduction on consant speed playback. It is also a fact that, if the recording of magnetic impulses is made at constant speed, variation in speed during playback will spoil the true reproduction of the recorded material. Constant speed during recording and the same constant speed during playback are, therefore, essential to accomplish true reproduction of magnetically recorded material.

This result is frequently difficult to attain, as may be readily surmised, even when the driving means itself operates at a constant speed, because the mechanical structure driving the record member usually is not free of slippage. That is, the record member which is frictionally driven by a constant speed drive roller or capstan may frequently slip because of excessive tension or poor frictional relationship between the drive roll and the record member. To assure a more firm contact between the tape and drive roll in an attempt to prevent slippage, an idler or pinch roll having a resilient surface is often brought into engagement with the record member on the side opposite to that which the drive roller contacts. The idler or pinch roll thus exerts a pressure on the record member to increase its frictional relationship with the drive roller. Even when such an idler is used, however, record slippage sometimes occurs because of the difference in speed between the contacting surfaces of the friction drive record member and idler by reason of their disposition and movement on different radii of curvature about the axis of the drive roller.

An important feature and object of the present invention is to provide a drive mechanism for magnetic recording devices which eliminates the factors causing slippage.

Another object of the present invention is to provide a new means for assuring firmer contact between a record member and the drive roller.

A further object of the present invention is to provide a novel means for causing frictional engagement between the record member and the drive roller.

A still further object of the present invention is to provide a novel method and means for equalizing the speed of moving friction surfaces in a drive system for record members.

Still another object of the present invention is to provide a new type of idler roller for magnetic record member drive mechanisms in which excessive deformation of the idler roller contact surface is prevented.

Another and still further object of the present invention is to provide a novel method and means for driving the record member at a constant speed with greatly reduced wear and tear on the record member and parts associated with driving such member.

The novel features which I believe to be characteristic of my invention are set forth within the appended claims. My invention itself, however, both to its organization, manner of construction, method of operation, together with further objects and advantages thereof, may best be understood by reference to the following description, taken in connection with the accompanying drawing, in which:

Figure 1:
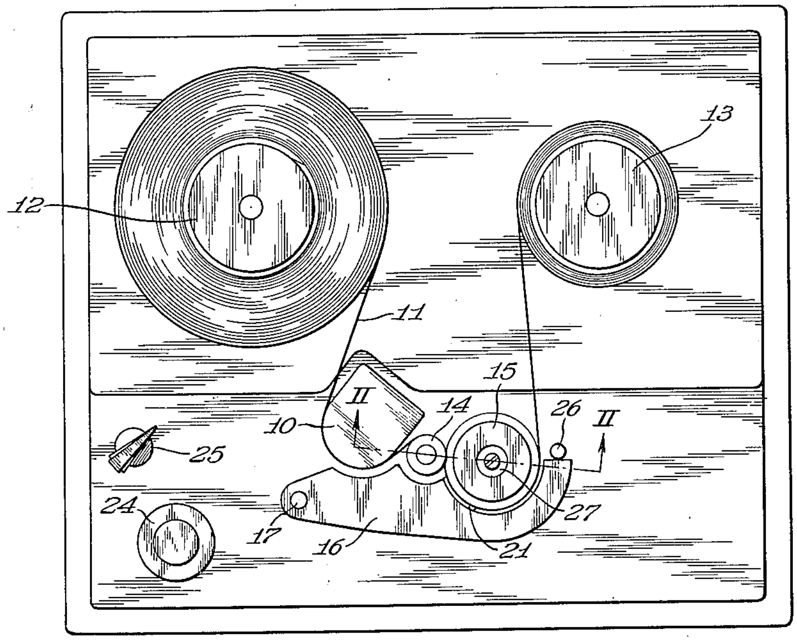
Figure 1 is a plan view showing the lay-out and elements of a magnetic recorder of the type with which the present invention may be associated.

Referring now to Figure 1 of the drawing, I have illustrated therein the general arrangement of a magnetic recording machine including a magnetic head assembly 10, a magnetic record member 11, a supply reel 12, a take-up reel 13, a drive roll or capstan 14 and a pinch roll 15. The operation of the machine is controlled by the "on-off" switch 25 while direction of the movement of the tape 11 is controlled by the reversing switch 24. The record member 11 which may be of the type commonly used, such as, cellulose acetate coated with magnetizable material, is threaded through the magnetic head 10 from the supply reel 12 and then between the drive capstan 14 and pinch roll 15 from where it is wound on the take-up reel 13. The pinch roll 15 is mounted on an assembly arm 16 which swings about the pivot pin 17. The pinch roll 15 is utilized to provide sufficient frictional engagement between the tape 11 and drive capstan 14 and to assure that no slippage will occur between the two during operation of the recording machine. Frictional engagement is provided by threading the tape 11 around pinch roll 15 so when the machine is operating the pinch roll and its assembly arm 16 are pulled toward the drive capstan under tension of the record tape until the assembly arm is abutting stop pin 26. In this position, the pinch roll 15 is close enough to the drive capstan to cause it to exert a holding pressure on tape 11 pushing it against the drive capstan 14. The pinch roll 15 is purposely made wider than the tape 11 which it contacts so that the alignment of the two with relation to each other is not critical.

Figure 2:
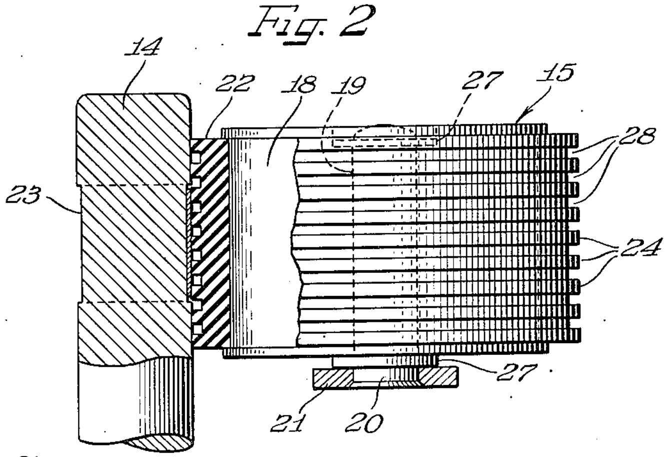
Figure 2 is an elevational view of a few of the elements shown in Figure 1 as taken on line II—II.

As shown in Figure 2, the pinch roll 15 comprises a spool-shaped hub 18 having a hole through its center which provides a means for mounting the pinch roll on a vertical pin 19 mounted on projecting portion 21 of the pinch roll assembly arm 16. The pinch roll rotates on a vertical axis provided by a shaft or pin 19 between a pair of thrust washers 27, one placed on either side of the roll.

The frictional contact surface for the pinch roll is provided by a band 22 of resilient material such as rubber or neoprene or other material having a high coefficient of friction. Band 22 acts as a tire for the pinch roll 13 and makes the pressure contact against the record tape 11 and one or both adjacent portions of the drive capstan 14.

The drive capstan 14 is a rigid member made of material such as steel, and it is a feature of my invention that it be provided with a flat groove 23 about its circumference at the vertical position in the capstan where the recording tape 11 is contacted in normal operation. The depth of this groove 23 is substantially equal to the thickness of the record tape which it drives and is somewhat wider. The tape width then fits within the groove and makes frictional contact with the bottom surface of the groove 23 while the recording machine is in operation. The surface of the record tape contacted by the pinch roll thus moves at the same speed as the engaged surfaces of the drive capstan 14 contacted by the pinch roll 15. While the depth of the groove is indicated as being equal to the thickness of the tape, it may be advantageous in some cases to make it slightly different to allow for such factors as the variations in tape thickness which occasionally occur and also for the compressibility of the tape used. If the groove were not thus provided and the drive roll were straight across its length, the outer surface of the driven tape would move at a greater speed than the surfaces of the drive capstan contacted by the pinch roll. The pinch roll 15 would, under these conditions, contact surfaces moving at different speeds, and those surfaces having the least frictional force between them would slip. In such cases, experiments have shown that slippage usually occurs between the tape and the drive roll to spoil the constancy of speed desired in magnetic recording. The location of the groove in my invention is not to be limited merely to placement of a tape groove on the circumference of a drive capstan but extends also to placement of such a groove in the surface of a pinch roll operating in conjunction with a straight drive roll, provided that the tape is trained around at least a portion of the pinch roll in the vicinity of the point of contact between the pinch roll and the drive roll, thus obtaining similar results of equalized speed at contacting friction surfaces when the record tape is driven by the mechanism.

To prevent excessive distortion of the band 22 during operation of the recording machine, a plurality of annular grooves 28 are provided in the pinch roll band 22. These grooves 28 provide expansion room for each of the contacting projections or teeth 24 when the teeth are in contact with the tape 11 or drive capstan 14. Each groove or projection 28 while under pressure thus has only a slight side expansion or bulge at the points of pressure. The teeth 24 are so spaced on the pinch roll contacting surface that sufficient clearance is provided between the teeth at the transition points between the grooved and outer surface portions of the capstan when the pinch roll contacts both such surfaces. Thus, none of the teeth 24 overlap two surfaces since each tooth definitely contacts either the record tape alone or the portions of the drive capstan adjacent the groove. By providing expansion room for projections 24 as described, band 22 is made effectively softer, since it can more readily shape itself to the contours of surfaces which it contacts. The grooves also provide room for dirt particles caught between the friction surfaces, thus preventing the grinding of the particles into the surfaces. In addition, the grooves increase the life of band 22 since they eliminate the large bulge which would normally result at the extreme sides of the band and would result in excessive working of the contacting surface with constant usage.

Figure 3:
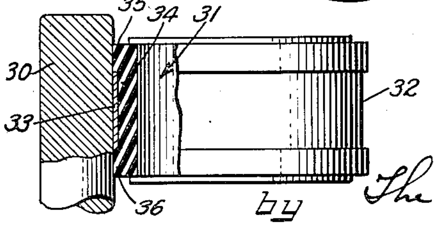
Figure 3 is an elevational view of a modified form of the invention in which the pinch roller is provided with a groove to receive the tape.

Figure 3 illustrates a modified form of the invention in which the pinch roller is provided with a permanent groove. As shown in this figure, this modified form of the invention uses a smooth surfaced capstan 30 in combination with a pinch roller generally indicated at 31. The pinch roller 31 has a permanent groove 32 formed therein of a sufficient width and thickness to accommodate an elongated record tape 33 therein. The groove 32 is formed in an annular band 34 which is secured to the hub of the pinch roller 31. Portions of the band 34 beyond the limits of the groove 32, these portions being identified at 35 and 36, are in frictional engagement with the surface of the capstan 30. This modified form of the invention functions in substantially the same way as the other form of the invention previously discussed, in that the permanent groove accommodates the magnetic tape, with one surface of the tape in contact with the capstan, and the opposite surface seated at the base of the permanent groove, to prevent slippage between the respective surfaces of the tape and the peripheral surface of the roller with which the surface of the tape is in contact.

While I have shown a particular embodiment of my invention, it will, of course, be understood that I do not wish to be limited thereto, since many modifications may be made and I, therefore, contemplate by the appended claims to cover all such modifications as follow in the true spirit and scope of my invention.

I claim as my invention:

1. In magnetic recording apparatus including means to impart velocity to an elongated record tape, a tape drive mechanism comprising a drive roll and a pinch roll, said drive roll having a flat groove about its circumference wide enough to allow the width of said tape to fit therein and having a depth substantially equal to the thickness of said tape, a pinch roll assembly arm on which said pinch roll is mounted, said assembly arm being mounted in a pivotal position to allow movement of said pinch roll into pressure and friction engagement with said tape and portions of said drive roll on at least one side of said groove.

2. In magnetic recording apparatus, a record member drive mechanism comprising a drive roll and pinch roll, said drive roll having a flat groove about its circumference of a width and depth sufficient to receive snugly a record member therein, said pinch roll being disposed over said groove and in close engagement with portions of said drive roll on both sides of said groove thereby to provide an opening between said drive and pinch rolls through which a record member may be driven.

3. In magnetic recording apparatus, a tape drive mechanism comprising a friction drive roll and a pinch roll arranged to receive a tape therebetween, said drive roll having a tape groove therein substantially equal in depth to the thickness of said tape, said tape being disposed to make contact with said drive roll in said groove, a pinch roll assembly arm, said arm being pivotally mounted as to be movable into a position of close engagement with said tape in said groove and portions of said drive roll on at least one side of said groove, thereby to press said tape into frictional engagement with said drive roll.

4. In magnetic recording apparatus, a drive roll having a tape groove and a cooperating pinch roll, said pinch roll having a contact surface of resilient material within which annular expansion grooves are provided.

5. In magnetic recording apparatus, a drive roll having a recording tape groove, and a cooperating pinch roll substantially wider than said tape groove, said pinch roll having about its circumference a band of resilient friction material in the outer surface of which annular grooves are provided.

6. In magnetic recording apparatus, a rotary tape drive means associated with a rotary pinch means, an indentation for a record tape in said rotary drive, said indentation being of such depth that when said tape is seated therein the outer surface of said tape is substantially flush with the portions of said rotary drive on at least one side of said indentation, said pinch means being movably mounted to allow simultaneous pressure engagement of said pinch means with both said tape and flush portions of said drive means thereby to cause a greater frictional relationship between said tape and drive means.

7. In combination, a rotary tape drive means having an indentation for receiving a record tape, said indentation being of such depth that one flat surface of said tape is flush with portions of said drive means adjacent to said indentation when the other flat surface of said tape makes contact with the bottom of said indentation, a pinch means movably mounted to allow pressure engagement with said flush surfaces under the action of said driven tape, said pinch means having a resilient contact surface with expansion grooves provided therein.

8. In magnetic recording apparatus, a record member drive roll and a cooperating pinch roll, said pinch roll having a contact surface of resilient material within which a permanent annular record groove is provided, said record groove being sufficiently wide to accommodate record members to be driven and substantially equal in depth to the thickness of said record members.

9. In magnetic recording apparatus, a drive roll having a tape groove and a cooperating pinch roll, said tape groove being sufficiently wide to accommodate the total width of a tape member therein, said pinch roll having annular contact teeth of resilient material provided on its circumference, said pinch roll being arranged to contact a tape disposed within said groove and portions of said drive roll on at least one side of said groove and in such a manner that no one of said teeth contacts more than one of said surfaces.

10. In magnetic recording apparatus, a drive roll having a tape groove and a cooperating pinch roll, said tape groove being sufficiently wide to accommodate the total width of a tape member therein, said pinch roll having annular contact teeth of resilient material provided on its circumference, said pinch roll being arranged to contact a tape disposed within said groove, said roll being so disposed that it contacts said tape and portions of said drive roll adjacent at least one edge of said groove, the distance between said teeth being such that expansion clearance is provided and the distance between those of said teeth adjacent transition points between different surfaces being such that no more than one surface is contacted by any one of said teeth.

11. In a magnetic recording apparatus, a driven roller, an idler roller having peripheral surfaces engaging peripheral surfaces of said driven roller in frictional driving engagement, the rollers being separated along a portion of their peripheral surfaces by a permanent groove of a width and thickness sufficient to accommodate an elongated record tape with one surface of the tape contacting the driven roll and the opposite surface contacting the idler roll, thus preventing slippage between a surface of the tape and the peripheral surface of the roller with which it is in contact.

MARVIN CAMRAS.

REFERENCES CITED

The following references are of record in the file of this patent:

UNITED STATES PATENTS

| Number | Name | Date |
|---|---|---|
| 633,967 | Smith | Sept. 26, 1899 |
| 2,227,694 | Bates | Jan. 7, 1941 |
| 2,287,768 | Eckstein | June 30, 1942 |
| 2,374,504 | Salfisberg | Apr. 24, 1945 |

FOREIGN PATENTS

| Number | Country | Date |
|---|---|---|
| 456,884 | Great Britain | Nov. 17, 1936 |